455-619 AU 233 EX
FIP8106 OR 3,792,256

United States Patent [19]
Harting

[11] 3,792,256
[45] Feb. 12, 1974

[54] INPUT CIRCUIT FOR OPTICAL SIGNAL RECEIVER

[75] Inventor: Stephen W. Harting, Los Angeles, Calif.

[73] Assignee: Computer Transmission Corporation, Los Angeles, Calif.

[22] Filed: June 19, 1972

[21] Appl. No.: 263,822

[52] U.S. Cl. .................................... 250/199
[51] Int. Cl. .................................... H04b 9/00
[58] Field of Search.... 250/199, 200, 213 A, 213 R; 329/144; 330/3, 3.4, 9; 338/49, 320, 223–225, 324, 319

[56] References Cited

UNITED STATES PATENTS

| | | | |
|---|---|---|---|
| 2,587,589 | 3/1952 | Bordewieck | 250/200 |
| 2,877,355 | 3/1959 | Young | 250/200 |
| 3,657,543 | 4/1972 | Rose | 329/144 |
| 3,223,938 | 12/1965 | Brook | 250/199 |
| 2,724,761 | 11/1955 | Cisne | 338/324 |

*Primary Examiner*—Albert J. Mayer
*Attorney, Agent, or Firm*—John E. Wagner

[57] ABSTRACT

This disclosure involves an improved input circuit for receivers for optical energy and particularly receivers designed to respond to data modulated optical energy. The input circuit employs a light responsive diode connected in series with a capacitance balanced coaxial resistor.

The coaxial resistor employs a stable carbon resistor connected as the series resistor with the diode and an outer encircling capacitance compensating resistor connected in the feedback path from a field effect transistor.

In another embodiment, a coaxial resistor is connected between the output and inputs of an operational amplifier. In another embodiment the light responsive diode is enclosed in a shield except for the face of the diode exposed to incoming signal.

7 Claims, 9 Drawing Figures

INPUT CIRCUIT FOR OPTICAL SIGNAL RECEIVER

REFERENCE TO RELATED APPLICATIONS

This disclosure involves improved input circuit for the optical data transmission system of application Ser. No. 109,263 filed Jan. 25, 1971 now U.S. Pat. No. 3,705,986 issued Dec. 12, 1972 and assigned to the assignee of this application.

BACKGROUND OF THE INVENTION

Photo-optical receivers typically employ a light sensitive diode connected in series with a resistor as a voltage divider with the potential of the point between the resistor and the diode varying as a function of the light input as reflecting the change in current of the diode. The voltage change constituting the signal input to the system is amplified by an amplifier connected to the midpoint. However, the bandwidth of the receiver and the rise time are both functions of the value of the fixed or load resistor and of the shunt capacitance across the input of the amplifier. This characteristic can be represented by the formula $T_r$ ( 10 – 90 percent ) = 2.2 RC. One approach to the increase of bandwidth of such circuits is in the form of a boot strap circuit employing the addition of a feedback loop with positive gain to reduce the shunt capacitance across the load resistor. Such feedback loop tends to produce an unstable circuit with a tendency to oscillate. Another approach to the solution of this problem is merely the use of electrostatic shielding of as many of the components and leads in the input stage of the circuit. However, shielding alone has proved to be insufficient to reduce the stray capacitance or significantly increase bandwidth.

One other approach to the increase of bandwidth is the use of the light sensitive resistance member such as the cadmium sulfide cell as the load resistor. Such cadmium sulfide cells exhibit the desirable characteristic of low internal noise and slow response themselves to light transients. However they seem to be of little value in the reduction of the amplifier shunt capacitance.

One other approach is the use of a field effect transistor as an active load resistor. However, I have found that the input impedance of the system will change as a function of the current through the field effect transistor and the bandwidth is therefore a function of transistor current, a completely unacceptable characteristic. Also the circuit employing this field effect transistor as a load resistor tends to be unstable and oscillate.

BRIEF STATEMENT OF THE INVENTION

Faced with the foregoing requirements and difficulties with the circuits in the prior art I have found that the use of the passive load resistor at the input stage is superior to any active circuits provided the shunt capacitance of the resistor can be neutralized. I have also discovered that this can be accomplished by the interconnection of a pair of coaxial resistance members having a common terminal effectively grounded and with the internal resistor connected as the conventional load resistor to the photo optical diode and the outer resistor connected by a feed-back connection from the amplifier stage.

An alternate embodiment of the amplifier is an operational amplifier with the inner and outer coaxial resistors connected to the two input terminals to the operational amplifier.

BRIEF DESCRIPTION OF THE DRAWING

The foregoing description of this invention may be more clearly understood from the detailed description and by reference to the drawing in which.

DETAILED DESCRIPTION OF THE INVENTION

Figures 1, 2:
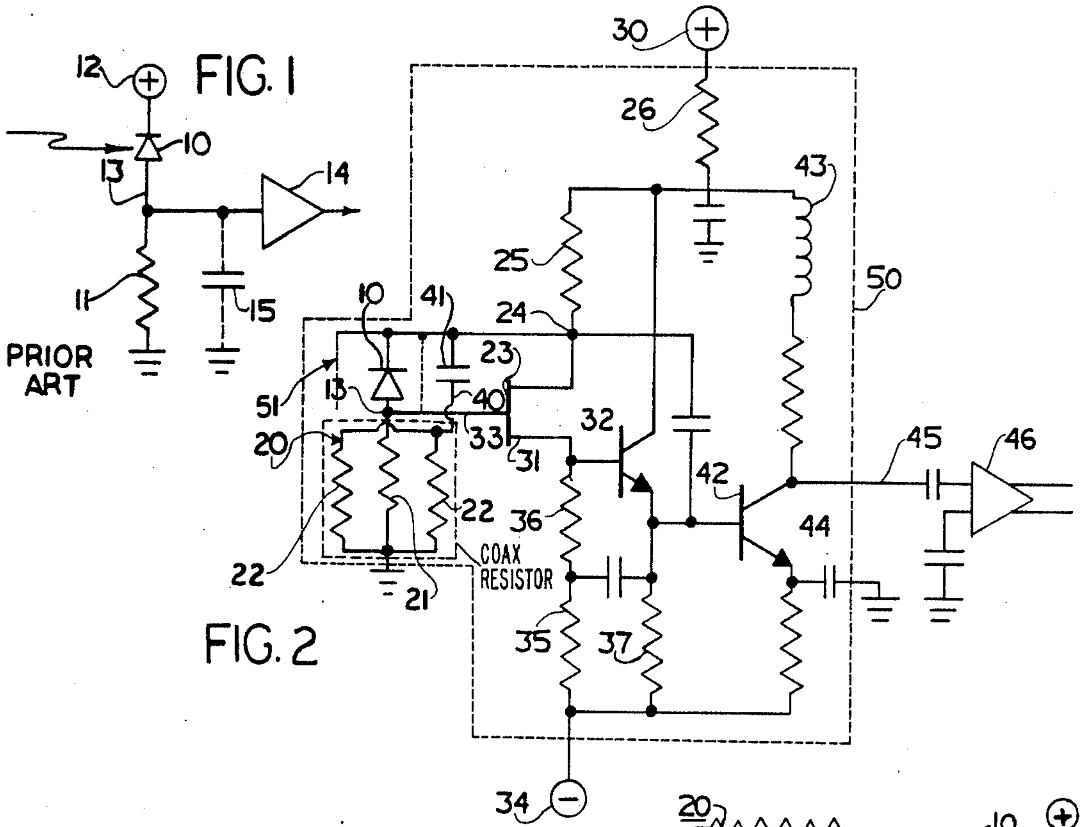
FIG. 1 is a simplified schematic diagram of the prior art.
FIG. 2 is an electrical schematic diagram of the input stage of a photo-optical receiver employing this invention.

Now referring to FIG. 1 the simplified embodiment of the typical photo responsive input circuit as shown including a light responsive diode 10 and a load resistor 11 connected in a series voltage divider between the power supply 12 and ground. The junction point or terminal 13 between the anode of diode 10 and the load resistor 11 constitutes the electrical signal source in the system. An amplifier 14 has its input connected to the junctions 13 and the output to the data or signal processing equipment associated with the receiver. Light falling on the diode 10 results in current flow through the diode 10 and resistor 11 and produces a voltage drop between the junction 13 and ground which is in function of the light intensity. This voltage when amplified in amplifier 14 constitutes the output signal of the receiver stage.

In FIG. 1 a shunt capacitance 15 is represented by dash lines reflecting the lead and particularly the capacitance of the resistor 11 to ground. The shunt capacitance limits the bandwidth and rise time of the amplifier in accordance with the formula given above. This invention is directed towards the cancellation of the stray capacitance 15. In a typical circuit of FIG. 1 the capacitance 15 is approximately 1 picofarad which tends to limit the bandwidth of the circuit to approximately 15 kilohertz.

The amplifier in the embodiment of FIG. 2 corresponding to amplifier 14 of FIG. 1 comprises the field effect transistor 23 with its source electrode connected to a junction 24 and through a pair of dropping resistors 25 and 26 to a positive voltage source 30 while its drain electrode 31 is connected to the base of a second stage amplifier NPN transistor 32 and its gate electrode 33 connected to the junction 13. Negative bias for the field effect transistor 23 and NPN transistor 32 is supplied by source 34 through bias resistors 35, 36 and 37.

The ungrounded electrode of the outer coaxial resistor 20 is connected via lead 40 and capacitor 41 to the emitter of transistor 32 defining a basic boot strap configuration. The amplifier including field effect transistor 23 and NPN transistor 32 is biased for a gain as close as unity as possible, for example 0.98.

Connected as a grounded emitter stage is a transistor 42 which includes reactive elements including inductance 43 and capacitor 44 in its biasing circuits through it provide a nonlinear and in fact peaking characteristic at the high end of the spectrum of interest. This peaking amplifier serves to compensate for the predictable roll off characteristic of the combination of the amplifier stages and the resistor 20.

The foregoing constitutes the input stage of the system and is connected in turn by a lead 45 to further amplification which is represented by amplifier 46. This input stage is all enclosed in a shield represented by the dash line 50 which includes an opening near the diode 10 for entrance of light. In a preferred physical embodiment there is an additional shield connected to terminal 24 acting as a ground plane for further shielding. This is represented by shield line 51. The details of the structural arrangement are more clearly seen in FIGS. 6 and 7 described below.

Figure 3:
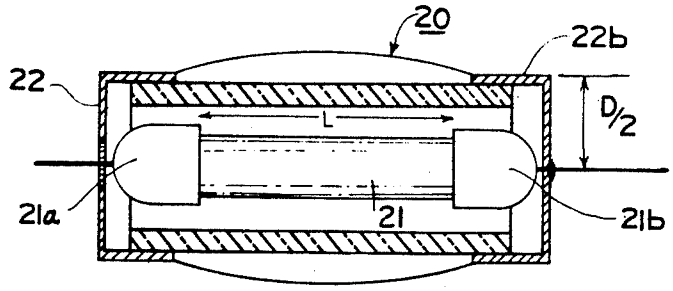
FIG. 3 is a longitudinal section through a coaxial resistance in accordance with this invention.

As is apparent from the foregoing description the critical element of this improved input circuit is the resistance member 20 which is shown in more detail in FIG. 3. This resistance element includes an inner resistor 21 and an outer tubular resistor 22. In both cases these resistors 21 and 22 have resistance layers which vary linear with length and both have an equal effective resistance length L as distinguished from the N caps 21 A and B of resistor 21 and 22 A and B of resistor 22. I have found that deposited carbon on an insulating substrate makes an ideal resistance layer for both the resistor 21 and 22 although ceramic base wire round resistors have also been found to be satisfactory exhibiting the reasonably uniform resistance with length characteristic. Employing this invention the resistor 21 is higher in value than resistor 22 with typical values of 10 megohms for the internal resistor 21 and 500 ohms for the outer resistor 22. I have found that the clearance between the resistive coatings of the two resistors 21 and 22 is not critical provided reasonable concentricity is maintained or that the circuit is definitely more effective as the ratio of the length to the diameter of the assemblage increases. I have found that a normally 4:1 length to diameter (L/D) ratio is preferred and a minimum value of 2:1 is acceptable. Other characteristics which define the resistor 20 and its relationship to its associated amplifier are that the inside resistor must be higher than the outside resistor in value, the input impedance to the associated amplifier must be higher than the resistance of the inside resistor 21 and the gain of the amplifier must approximate 1. Of course, to avoid oscillation the gain must be slightly less than one and we have found that a gain of 0.98 has been eminently successful in this circuit.

Figure 4:
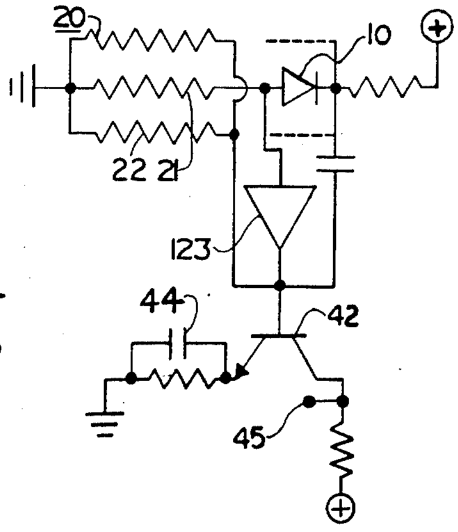
FIG. 4 is an alternate configuration of circuit employed in this invention.
Figures 5, 6, 7, 8, 9:
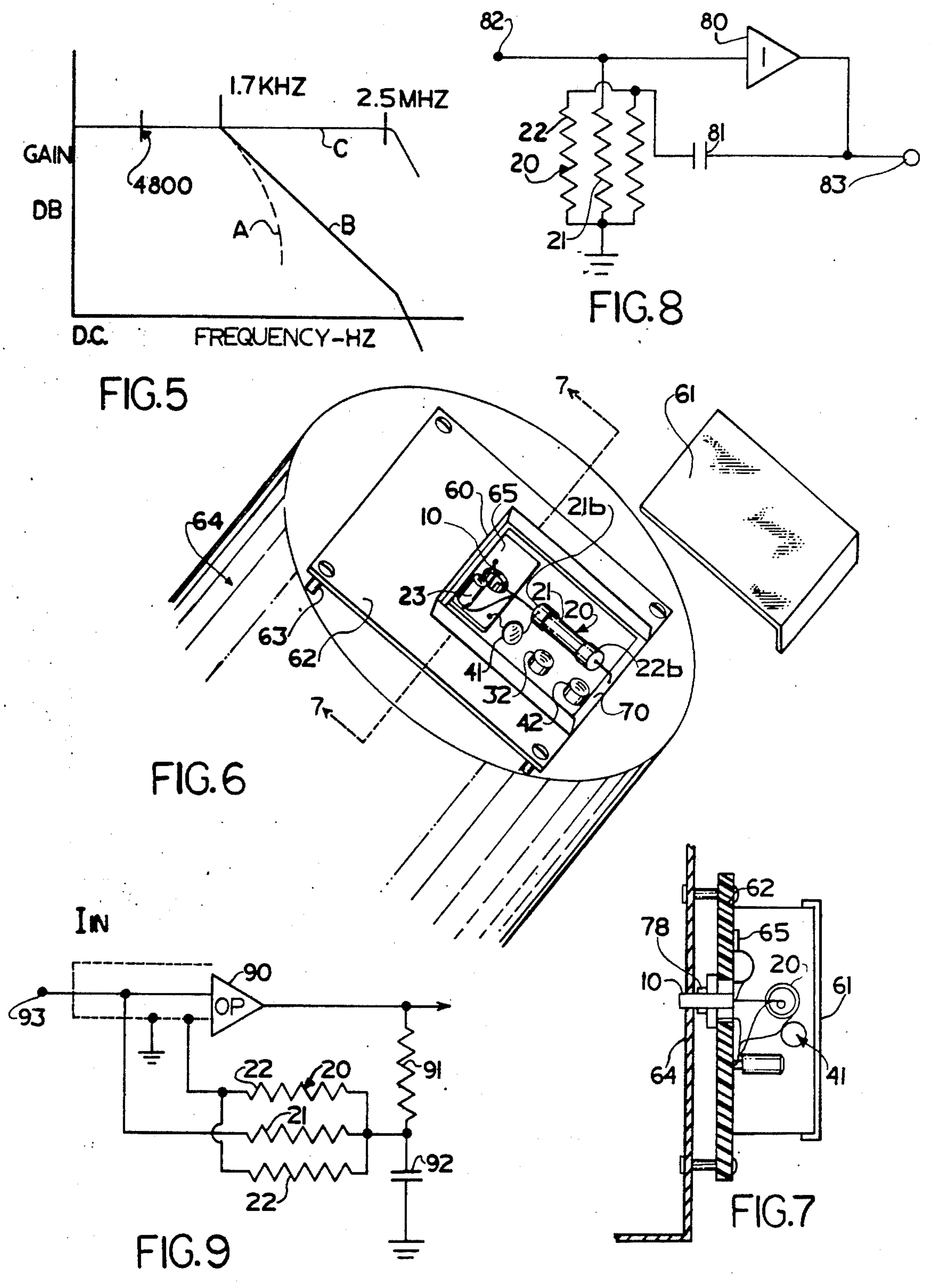
FIG. 5 is a frequency response characteristic diagram of receivers employing this invention.
FIG. 6 is a fragmentary isometric view of the rear of a photo detector assembly of the type described in the above referenced patent application but incorporating this invention and with shield cover removed.
FIG. 7 is a fragmentary sectional view of the assembly of FIG. 6 taken along line 7—7 of FIG. 6.
FIG. 8 is an electrical schematic drawing of this invention used as an electrometer.
FIG. 9 is an electrical schematic drawing of this invention as the preamplifier stage for a high impedence current source.

The resistor of FIG. 3 is not limited in application to the particular circuit of FIG. 1. Alternate applications are shown in FIG. 8 and FIG. 9 and will be discussed later. FIG. 4 illustrates simpler embodiment in which similar components are given identical designation including the diode 10, load resistor 20 and an amplifier 123. In this case the outer resistor 22 is directly connected to the output of the unity gain amplifier 123 rather than the capacitative coupling of FIG. 2. This circuit drives the peaking transistor 42. The amount of peaking is controlled by the resistor and capacitor 44 in the emitter circuit which gives a rising gain with frequency characteristic to this stage.

The effect of this invention particularly as embodied in FIG. 1 is apparent in the gain bandwidth characteristic shown in FIG. 5. The characteristic of the input circuit prior to modification is illustrated by the left hand solid line plus the (A) dash line beginning at approximately 1.7 Kilohertz. The high end roll off above 1.7 Kilohertz is not only too low to allow the use of the circuit for high frequency or high data rates but the roll off is nonlinear and nonuniform which makes compensation to produce a flat curve beyond the high frequency cutoff frequency virtually impossible.

By employing a coaxial input resistor and appropriate shielding the frequency response can be improved to that shown in FIG. 5-B. The important feature to note is the linear loss of gain as the frequency rises. If a single stage peaking amplifier is added, it is possible to adjust it such that it exactly compensates for the frequency response of FIG. 5-B thus obtaining an over all frequency response shown in FIG. 5-C.

Employing this invention the flat portion of the curve is extended out in the order of 2.5 Megihertz or improvement by a factor of 1,000. This is due to the reduction in effective capacitance at the input of the amplifier from approximately 10 picofarads before compensation to approximately 0.01 picofarad in approvement in the order of 1,000 times.

Obtaining the improvement described above involves a tremendous reduction in stray capacitance. This is not possible without effective shielding as well since the reduction in stray capacitance achieved by the use of the improved resistor and its associate amplifier could be lost if the circuit were exposed.

In FIGS. 6 and 7 the physical arrangement of the circuit in simplified form is illustrated. The circuit is enclosed within a metal box shield 60 is soldered to conductive areas on the surface of a printed circuit board 62. Shield 60 has a mating cover 61 shown removed. The printed circuit board 62 itself is secured by posts 63 to the back of the optical receiver shroud 64 of the type disclosed in the above-referenced patent application. Within the shield formed by body 60 and cover 61 are a number of the components the significant ones of which appear in the drawing. Additional components in actuality are mounted on the exterior portions of the board but have been eliminated from the drawing for purposes of clarity. The photo optical diode 10 of the circuit of FIG. 2 is secured to the underside of the board 62 and its own cylindrical walls provide its shielding. The leads of the diode 10 extend into the shield 60 through a plated through hole communicating with a ground plane 65 of printed circuit conductive material. The field effect transistor 23 is likewise secured to the printed circuit board 62 in the area of the ground plane 65. Transistors 32 and 42 are mounted in conventional manner on the printed circuit board 62 and resistor 20 has its one common lead attached to cap 22 B soldered to a printed circuit conductor path 70 which is in electrical contact with the shield 60. The outer resistor 21 is conducted by its cap 21 B to capacitor 41 which is in turn soldered to the ground plane 65 and thereby is in contact with the cathode electrode of diode 10. The remaining elements of the circuit of FIG.

2 shown in FIG. 2 as within the shield 15 are appropriately located within the box and connected by printed circuit paths all of which are eliminated again for clarity.

The cross sectional view of FIG. 7 illustrates the positioning of the resistor 20 within the shield 60 and on the board 62 supported by its leads. The photo diode 10 mounted by a collar 78 extends through the plated through hole in the printed circuit board 62 and is exposed in the center of the interior of the shroud 64. The ground plane 65 is apparent in section. When the cover 61 is in place the entire input stage is virtually shielded from stray external capacitance and the capacitance formerly related to the load resistor can now be effectively neutralized.

Given for foregoing understanding of this invention I have discovered that it may be applied to other applications where the photo diode itself is not involved. Such is illustrated in FIG. 8 employing the same resistor 20. The unity gain amplifier 80 and a capacitor 81. The common terminal of resistor 20 is grounded. When a current is supplied to input terminal 82 its level is converted to a voltage level at terminal 83 proportional to the level of the input current times the resistance Ri of the resistor 21. The frequency response will be similar to FIG. 5-B. A peaking amplifier is required to obtain FIG. 5-C. The circuit is particularly good for use as input amplifier for the probe of a high frequency oscilloscope or as a preamplifier for high impedence sources such as photo multiplier tubes or vidicon tubes.

The same invention is directly applicable to use in electrometer as shown in FIG. 9 employing the resistor 20 and operational amplifier 90 and an RC network including resistance 91 and capacitance 92. In this case as unknown current I in applied to terminal 93 through a shielded lead is introduced to the operational amplifier 90. The central resistor 21 is connected to the signal input lead and to ground through the capacitor 92. The outer resistor 22 is connected to the opposite polarity input the operational amplifier 90. This circuit constitutes an extremely high gain bandwidth amplifier which produces an output voltage directly proportional to the incoming current. This circuit is directly applicable to measuring apparatus.

From the foregoing description it is apparent that the combination of a pair of coaxial resistors in accordance with this invention and amplifying means I have been able to achieve an improved frequency response for capacitance sensitive circuits. The particular values of the components used of course depend upon the circuit applications. The circuit applications and the selections is within the knowledge of those skilled in the art. In the particular circuit of FIG. 2 following values and types were used.

What is claimed is:

1. An input circuit for optically sensitive receiver circuits comprising:

a diode exhibiting the property of changing current responsive to change in levels of radiant energy impinging thereon;

a first resistor with one terminal connected to the anode of said diode;

a second resistor having a first terminal connected to the second termal of said first resistor;

means for applying a potential across the combination of said diode and first resistor;

a first lead connected to the point between the anode of said diode and the said first terminal of said first resistor; and amplifier means having its input connected to said lead;

said first and second resistors being coaxially arranged with said second resistor surrounding said first resistor;

The second terminal of said second resistor being coupled to the output of said amplifier means.

2. The combination in accordance with claim 1 wherein said resistance elements have substantially uniform resistance per unit length and substantially equal lengths *L*.

3. The combination in accordance with claim 2 wherein the ratio of the length L to the diameter of the outer resistance element resistive layer is greater than 2.

4. The combination in accordance with claim 3 wherein the said ratio is in the order of 4.

5. The combination in accordance with claim 1 wherein said amplifier means has a gain of substantially 1.

6. The combination in accordance with claim 1 wherein the resistance of said first resistor is greater than the resistance of said second resistor.

7. The combination in accordance with claim 1 wherein the input impedance of said amplifier is greater than the resistance of said first resistor.

* * * * *